Sept. 24, 1957   F. C. SCHWANEKE   2,807,690
CONTROL DEVICE
Filed Nov. 12, 1953
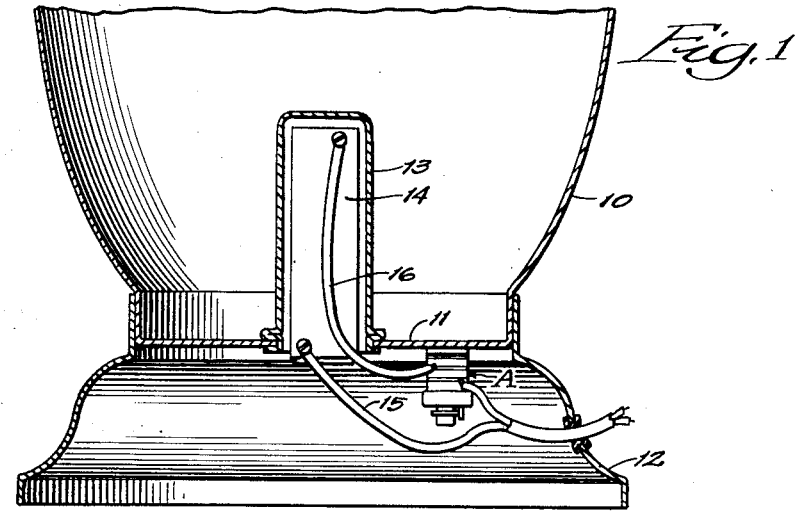
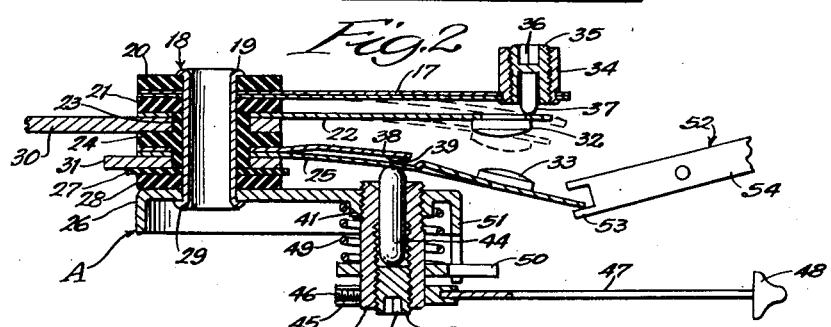
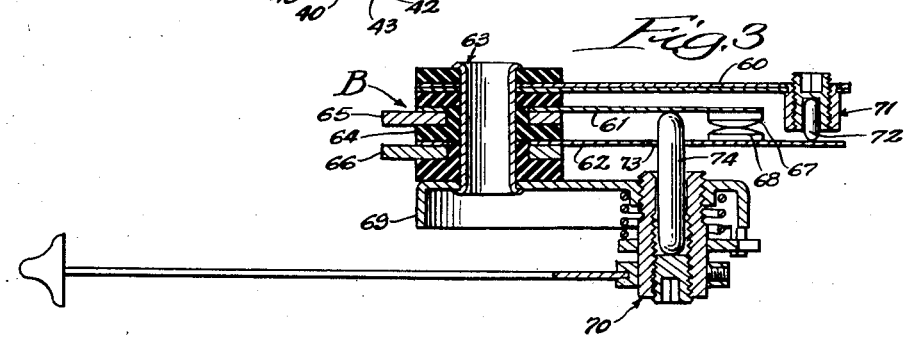
INVENTOR:
Fred C. Schwaneke,
BY
ATTORNEY.

United States Patent Office 2,807,690
Patented Sept. 24, 1957

2,807,690
CONTROL DEVICE

Fred C. Schwaneke, Chicago, Ill., assignor to A-M Corporation, Chicago, Ill., a corporation of Illinois Application November 12, 1953, Serial No. 391,591

12 Claims. (Cl. 200—139)

This invention relates to a control device and, more particularly, to a thermostatic control for electric circuits. The invention is especially useful in controlling the flow of current to a heating element of a household utensil such as a deep fat fryer, coffeepot, etc., but it will be appreciated that it may be used in a number of different applications to control current flow through a circuit in response to temperature.

In the past it has been difficult to provide accurate thermostatic regulation and control of the current flowing through a heating element to the extent that the user of the equipment incorporating the heating element and thermostatic control therefor could select the temperature at which the heating current could be interrupted. In cooking utensils such as are commonly found in the household kitchen, it is customary to provide these devices when they are heated by an electric current with selection means to provide the housewife with some degree of control over the heating temperature attained by the device. In deep fat fryers and coffeepots, for example, it is desirable to provide a relatively wide range within which the housewife may select a single temperature at which the utensil will discontinue heating. Heretofore, the accuracy of the thermostatic controls has been very poor, particularly where the heating ranges have been relatively large.

It is accordingly an object of this invention to provide thermostatic control apparatus that will overcome the disadvantages inherent in customary thermostatic controls. Another object of the invention is to provide accurate thermostatic response to preselected temperatures over a relatively wide temperature range. Still another object is in providing mechanical symmetry between the heat-responsive element and an electric contact member controlled thereby in a thermostat. Yet another object is in providing means for attaining geometric parallelism between a bimetallic heat-responsive element and an electric contact member controlled thereby, whereby inherent mechanical differences and differences resulting from manufacturing tolerances can be compensated for with the result that accurate thermostatic response to preselected temperatures over a relatively wide temperature range can be achieved. A further object of the invention is to provide vernier adjusting means for positioning an electric contact member relative to a bimetallic heat-responsive element so that manufacturing tolerances need not be held within close limits in order that parallelism between the bimetal member and electric contact member be achieved. Additional objects and advantages will appear as the specification proceeds.

Embodiments of the invention are illustrated in the accompanying drawing, in which—

Fig. 1 is a broken vertical sectional view showing a thermostatic control device embodying my invention in operative position within a coffeepot; Fig. 2 is a longitudinal sectional view of the thermostat shown in Fig. 1; and Fig. 3 is a longitudinal sectional view of a modified form of thermostatic control device embodying my invention.

Illustrated in the drawing are two slightly different types of thermostatic control devices, each of which embodies my invention. The thermostat shown in Figs. 1 and 2 is designated generally by the letter A and is a snap-type of thermostat wherein interruption of the electric circuit with which the thermostat is arranged is brought about by a snap action of one of the contact members when a predetermined temperature is attained. On the other hand, in Fig. 3, the thermostat designated generally with the letter B is one in which gradual movement of one of the contact members is provided in response to movement of the heat-responsive element to interrupt an electric circuit. In each instance, the inventive concept employed is substantially identical and the drawings simply show how the concept may be employed in different types of thermostatic controls.

Referring first to Fig. 1, it is seen that a coffeepot is partially indicated therein and is designated with the numeral 10. The coffeepot may take any desired configuration and may be made of any metal, and for that matter can be a coffeepot provided by any of a number of manufacturers. The coffeepot 10 has a bottom wall 11 and is equipped with a base 12 and also with an upwardly-extending centrally oriented hollow cylinder 13 adapted to receive therein a cartridge-type heating element 14. The heating element 14 has at least the usual leads 15 and 16 connected thereto, one of which leads through an aperture in the base 12 and is adapted to be connected to an electric cable. The other lead also extends through the opening in the base 12 and to the same cable, but has interposed therein the thermostat A. Preferably, the thermostat A is mounted upon the bottom wall 11 of the coffeepot and, most desirably, the wall 11 is formed of a material having relatively good heat-conducting properties, although this is not critical.

Referring now to Fig. 2, it is seen that the thermostat A comprises a heat-responsive element 17 that is preferably a bimetallic member that deflects in response to the application of heat thereto. Bimetallic members of this character are well known in the art and a detailed description will not be set out for this reason. At one end, the element 17 is equipped with an opening therethrough that receives therein a sleeve 18 that is preferably formed from a metal having good heat-conducting properties. The sleeve 18 may be flared outwardly at its upper end 19 to provide a shoulder which is engaged by an insulating disc 20. A further insulating disc 21 is also provided and the two discs 20 and 21 receive the end of the element 17 therebetween. The element 17 should be in contact with the sleeve 18 so that the heat received by the member 18 from the coffeepot will be quickly transferred to the heat-responsive element 17.

Received about the sleeve 18 and adjacent the lower insulating disc 21 is a first electrical contact member 22 that is electrically insulated from the sleeve 18 by an insulating tube 23 that is equipped with an outwardly-extending flange 24. The contact member 22 is thus electrically insulated from the sleeve 18. Mounted below the flange member 24 and received about the tube 23 is a second electrical contact member 25. The member 25 is separated from a rigid bracket 26 by further insulating discs 27 and 28. The lower end of the sleeve 18 is flanged outwardly to provide a shoulder 29 that abuts the lower side of the bracket 26. It is apparent, then, that the sleeve 18 provides a rigid mounting for the heat-responsive element 17 and the two electric contact members 22 and 25, while spacing these members apart through the insulating discs which electrically insulate each of the members from the others.

A terminal 30 is also mounted about the sleeve 18 and tubular insulator 23 and is in electric contact with the member 22, while similarly mounted terminal 31 is in electric contact with the member 25. Contact member 22 is equipped with a point 32, while member 25 is equipped with a point 33. The points 32 and 33 are adapted to be brought together at least at one position of the members 22 and 25 to establish electrical connection therebetween.

The electrical contact member 22 is preferably formed of a spring material and is biased in an upward direction toward the bimetallic heat-responsive member 17. Most desirably, a condition of substantial geometric parallelism exists between the element 17 and member 22 for it has been discovered that where this condition exists, more accurate response of the thermostatic control device is provided, as will be hereinafter brought out. Since the member 22 is spring-biased toward the element 17, it is necessary to separate these members and this is accomplished by equipping the outer end of the element 17 with a threaded nut 34. The nut 34 may be secured to the member 17 by any suitable means and should be rigidly held thereby. Threadedly received within the nut 34 is an adjustable plunger 35 having an opening 36 in the top thereof adapted to receive an Allen wrench or other adjusting device. Rigidly received within a recess provided in the lower end of the plunger 35 is a pin 37 that is formed from an insulating material and which engages at its lower end the contact member 22 at least at the points 32 and 33 beyond sleeve 18 as shown for maximum parallelism. It will be apparent that the plunger 35 may be rotated relative to the nut 34 to adjust the position of the pin 37 and thereby the spacing between the element 17 and contact member 22, which is biased toward the member 17, and into engagement with the pin 37.

Contact member 25 is of the snap action type wherein, upon flexing movement thereof to a predetermined position, the member buckles and snaps quickly to a second predetermined position in the direction of movement. Members of this character are also well known in the art and a detailed description of their construction is therefore believed unnecessary to an adequate description of the invention herein involved. It may be sufficient to state that mounted above the member 25 is a reinforcing member 38 provided at its tip with a contact point 39 that engages the upper surface of the member 25. Reinforcing member 38 is formed of spring metal and is biased downwardly toward the member 25.

It is necessary that the second contact member 25 establish electric connection with the first contact member 22 in at least one position. To insure such contact, adjustable means are provided that are operative to bring the two contact points 32 and 33 carried respectively by the members 22 and 25 together, irrespective of the position assumed by the member 22 after adjustment thereof to bring about a condition of parallelism with the heat-responsive member 17. This adjusting means includes a tubular nut 40 that is threaded at its upper end and is threadedly received within a boss 41 provided by the bracket member 26. The member 40 is also threaded internally at its lower end portion and threadedly received therein is a threaded plunger 42 equipped with an opening 43 in the lower end thereof that is also adapted to receive an Allen wrench to provide adjustment thereof. Frictionally received within a passage through the upper end of the member 40 is a pin 44 made from an insulating material and which engages at its outer end the contact member 25. Adjustment then of the plunger 43 is effective to position the pin 44 and thereby the contact member 25. Preferably, the tube 40 in its entirety is rotatable to provide selective adjustment of the pin 44 and thereby the contact member 25 to establish the temperature at which the electric circuit through the control device will be interrupted.

The manual adjusting means includes a collar 45 secured to the tube 40 by a set screw 46 and a lever 47 carried by the collar 45 and which is equipped at its outer end with a knob 48. If desired, the base 12 of the coffeepot may be equipped with a scale with indicia thereon so that the knob 48 may be moved to the desired control temperature as is indicated on the scale. A spring 49 that seats at one end about the boss 41 and which at its other end engages a stop member 50 rigidly secured to the tube 40 and which is adapted to engage a depending leg 51 provided by the bracket 26, provides a sufficient force to prevent inadvertent change of position of the tube 40.

A pivotally mounted switch member 52 having a bifurcated inner end 53 and a notched outer end 54 adapted to be engaged for manual manipulation receives the outer end of the contact member 25 and is adapted to swing this contact member from a lower position, illustrated in Fig. 2, and in which the electric circuit through the thermostat is interrupted, to an upper position, not shown, in which the contact members 32 and 33 are in engagement. The character of the contact member 25 is such that it will maintain either the lowermost position illustrated or the uppermost position in which the contact points 32 and 33 are together until some mechanical force moves the member to the opposite position.

The control device illustrated in Fig. 3, and which has been given the letter B for designation, is similar in construction and operation to the thermostat described, and before the operation of thermostat A is set out the construction of the thermostat B will be described. Thermostat B includes a bimetallic heat-responsive member 60, a first contact member 61, and a second contact member 62, all of which are mounted upon a sleeve 63 in spaced-apart relation by means of the insulator members 64 in a manner almost identical to the construction heretofore described. The members 61 and 62 are equipped respectively with terminals 65 and 66 and with contact points 67 and 68. The sleeve 63 is secured to a bracket 69 which carries the adjusting means to provide selection of the temperature at which the thermostat interrupts the electric circuit and which is here designated generally with the numeral 70. Since the adjusting means 70 is the same as the adjusting means carried by the bracket 26 of the Fig. 2 illustration, the adjusting means will not again be described. Similarly, the adjusting means designated generally with the numeral 71 that is operative to provide a condition of geometric parallelism between the heat-responsive element 60 and the second contact member 62 will not be described in detail. As before, the members are carried by the element 60 while the pin 72 engages at its lower end the second contact member 62 at least at points 67 and 68 beyond sleeve 63 for maximum parallelism.

Contact member 61, in the embodiment illustrated in Fig. 3, is designed to remain substantially stationary while the lower contact member 62 is moved away therefrom in response to a change of position of element 60. The other essential difference is that the lower contact member 62 is provided with an opening 73 therethrough that receives therein the pin 74 forming a part of the adjusting means 70. The thermostatic control B is particularly useful in deep fat fryers and other similar cooking utensils.

In the case of either the thermostatic control A or the control B, the member is mounted in heat-exchange relation with the particular utensil that it controls and this may be accomplished by equipping a suitable heated surface of the utensil, such as the bottom wall 11 of the coffeepot 10, with nut means adapted to receive a bolt or cap screw extending through the sleeve 18 or 63, and which thereby rigidly secures the control to the heated surface. Thus the heat-responsive element 17 or 60 will receive heat from the heated surface and will quickly respond to the temperature of such surface. In the Fig. 2 embodiment, initially the lower contact member 25 will be moved manually by pivoting the member 52 into an upper position in which the points 32 and 33 are brought together. As the element 17 is heated it deflects downwardly and carries with it the upper contact member 22 which, then, pushes the lower contact member 25 downwardly. Eventually the upper contact member 22 and the element 17 reach the position illustrated by dotted lines in Fig. 2 which defines the buckle point of the element 25, and the outer end of element 25 then snaps downwardly into the position shown in Fig. 2. Thus the electrical heating circuit is interrupted. Member 25 remains in this position even though the element 17 and member 22 return to the position shown in full lines in Fig. 2. Therefore, to reestablish the heating circuit, it is necessary to manually move the member 25 upwardly through the member 52.

Similarly, in the embodiment shown in Fig. 3, when the element 60 is heated it deflects downwardly and carries with it through contact with the pin 72 the lower contact member 62. Eventually, in this downward movement, the contact points 67 and 68 open and the heating circuit is interrupted. When the element 60 cools and returns to its initial position, the lower contact member 62 follows since it is spring biased upwardly toward the element 60, and when the initial position is resumed the engagement of points 67 and 68 reestablish the heating circuit.

Manual selection of the temperature within a given range of temperatures at which the thermostatic control will respond is provided by adjusting the position of the tubular member which changes the axial position of the pin 74 in the Fig. 3 embodiment, which has the effect of varying the position of upper contact member 61. For example, if the tubular member is rotated so that the pin 74 moves downwardly, the contact member 61 moves downwardly since it is spring biased in that direction and the spring force is sufficient to overcome the spring biasing force of the contact member 62, and contact member 62 is therefore carried downwardly by the member 61. Therefore, the pin 72 will be spaced from the lower contact member 62 and greater movement of the element 60 will be necessary before the element will be effective to push the contact member 62 away from the contact member 61. On the other hand, if the tube is rotated upwardly to advance the axial position of pin 74 until contact is barely established between the point 67 carried by member 61 and point 68 carried by member 62 when member 62 is in its initial position, then the very slightest movement of element 60 will open the points 67 and 68 and break the electric circuit.

Substantially the same situation exists in the Fig. 2 embodiment for if the tube 40 is rotated to raise the position of pin 44, a smaller movement of the element 17 and contact member 22 will be necessary to push the outer end of member 25 past the buckle position than if the pin 44 is moved in an opposite direction to lower the position of the member 25 relative to the element 17 and contact member 22.

I have discovered that it is virtually impossible to produce thermostatic control devices of the character here described in an ordinary manufacturing operation which will respond accurately to preselected temperatures within a relatively wide temperature range. For example, in many cooking utensils such as deep fat fryers, it is necessary to provide a temperature selection range of from 220° F. to 550° F. There are inherent differences in the mechanical characteristics of the elements and members that comprise the thermostatic controls and, further, unless manufacturing tolerances are held within close limits, which increases the cost tremendously, further differences appear that make accurate control response difficult. I have found that where mechanical or geometric parallelism exists between the heat-responsive element and the contact member controlled thereby, that very accurate temperature response can be achieved. For example, through a range of approximately 220° to about 550° F. the control device will respond to any selected temperatures within about 5° of accuracy. Thus, where the thermostatic control devices embody parallelism between the members, accurate response results.

I have provided a simple means for obtaining such geometric parallelism irrespective of the inherent differences in the members comprising the thermostatic control and that arise when manufacturing tolerances are not held within close limits. The adjustment consists essentially, as I have set out, of providing a contact member spring biased toward a bimetallic heat-responsive element and by providing adjusting means to establish the desired spacing between these two members and thereby develop a condition of parallelism.

While in the foregoing specification embodiments of the invention have been set out in considerable detail for purposes of illustration, it will be apparent to those skilled in the art that considerable change may be made in these details without departing from the spirit of the invention.

I claim:

1. In a thermostatic control device, an element adapted to deflect in response to the application of heat thereto, a first electrical contact member extending along the longitudinal axis of said element, and a second electrical contact member extending in substantially parallel relation with said element and being adapted to make and break electric contact with said first contact member and being controlled by said element, support means for an end of each of said members and said element and means which maintain geometrical parallelism between said element and said second contact member irrespective of differences in mechanical characteristics thereof.

2. The structure of claim 1 in which means are provided for adjusting the position of said first contact member to select the temperature within a predetermined range of temperatures at which said second contact member breaks contact with said first contact member under the influence of said element.

3. The structure of claim 2 in which said means provided for mounting geometrical parallelism between the said element and said second contact member comprises an adjustable pin extending between said element and said second contact member, each of said members carrying contact points in register, said pin being disposed at least at said points beyond said support means.

4. In a thermostatic control device, an elongated heat-responsive element normally occupying an initial position determined at least in part by the mechanical characteristics thereof, a first electrical contact member extending along the longitudinal axis of said element and in spaced relation therewith, a second electrical contact member extending along the longitudinal axis of said first contact member and in spaced relation therewith and being adapted in at least one position to make electric contact therewith while being also under control of said element, and adjustable means secured between said element and the second contact member maintaining a substantially geometric parallelism therebetween at least when said element is in its initial position.

5. The structure of claim 4 wherein said means comprises a pin adjustably carried by one of said element and said contact members and being in engagement with the other.

6. In the structure of claim 4 a bracket, a member threadedly engaged therein and a lever axially secured thereto whereby said first contact member is adjustable to establish electric contact with said second contact member at least when said element is in its initial position.

7. The structure of claim 6 in which said member has a pin and a plunger therein whereby a further adjustment is provided for said first contact member to provide selection of the temperature at which said second contact member breaks contact therewith under influence of said element.

8. A thermostatic control device, comprising an elongated heat-responsive element adapted to deflect in response to the application of heat thereto, a first elongated, electric spring contact member extending along the longitudinal axis of said element and in spaced relation therewith, a second elongated, electric spring contact member extending along the longitudinal axis of said element and in spaced relation therewith and with said first member, said second member being biased toward said element and said first member being normally biased toward said second member and being adapted to make electrical contact therewith at least in one position thereof, an adjustable pin extending between said element and said second member maintaining said element and said second member in geometrical parallelism, and means for adjusting the position of said first member to provide initial parallelism with said second member and electrical contact therewith in at least one position.

9. The structure of claim 8 in which said pin is adjustably carried in a threaded nut secured to said element.

10. The structure of claim 9 in which means are provided for manually adjusting said first member to select the temperature within a predetermined range of temperatures at which said thermostatic control device responds.

11. A thermostatic control device, comprising a sleeve adapted to be secured to a heated surface, a bimetallic heat-responsive member carried by said sleeve and extending laterally therefrom and being adapted to deflect in response to the application of heat thereto, a first electrical contact member carried by said sleeve but in insulated relation therewith and with said element and projecting laterally therefrom, a second electrical contact member carried by said sleeve in insulated relation therewith and with said first member and said element and projecting laterally therefrom, all of said members being elongated and extending in generally parallel relation, a pin adjustably carried by said element and adapted to engage said second member, said second member being spring biased toward said element whereby adjustment of said pin determines the spacing between said element and second member and permits a condition of parallelism to be provided therebetween during all times that the said contact members are about to make electrical contact or about to be separated, said first member being spring biased toward said second member, and adjusting means including a pin extending through an opening in said second member and engageable with said first member for adjusting the position thereof relative to said element.

12. A thermostatic control device, comprising a sleeve adapted to be rigidly secured to a heated surface, a bimetallic heat-responsive element carried by said sleeve and projecting laterally therefrom, a first electrical contact member carried by said sleeve in insulated relation therewith and with said element and projecting laterally therefrom, said first member being adapted to buckle upon the movement thereof past a predetermined position to provide a snap action, a second electrical contact member carried by said sleeve in insulated relation therewith and with said first member and said element and projecting laterally therefrom, said element and each of said members being elongated and extending from said sleeve in generally parallel relation, a pin adjustably carried by said element and adapted to engage said second contact member whereby adjustment of said pin establishes the spacing between said element and second member and provides means for creating a condition of parallelism therebetween, adjustable means for determining the position of said first contact member relative to said second contact member and to provide electrical contact therewith at least at one position of said second member, and means for moving said first member in either direction beyond the buckle point thereof.

References Cited in the file of this patent

UNITED STATES PATENTS

| | | |
|---|---|---|
| 2,267,387 | Winborne | Dec. 23, 1941 |
| 2,500,760 | Lee | Mar. 14, 1950 |
| 2,518,595 | Bletz | Aug. 15, 1950 |